Jan. 21, 1969    J. H. COWLES    3,423,140
BEARING SEALS FOR DRAWN CUP BEARINGS
Filed May 3, 1966    Sheet 1 of 2

INVENTOR
JOHN H. COWLES

BY Mason, Porter, Diller & Brown
ATTORNEYS

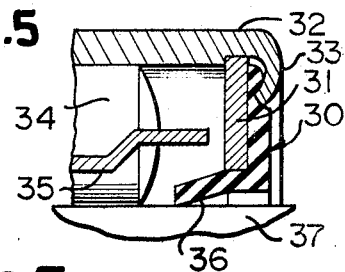
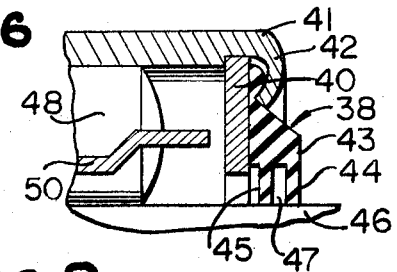
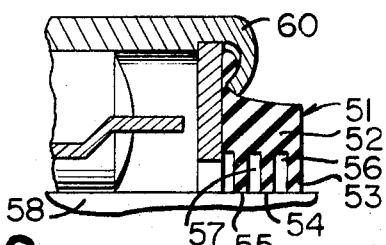
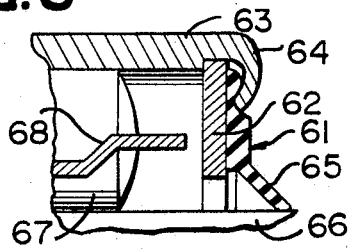
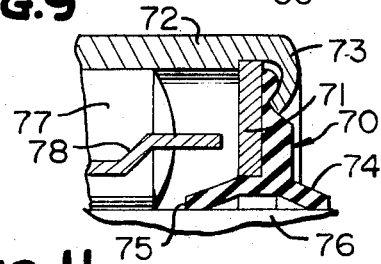
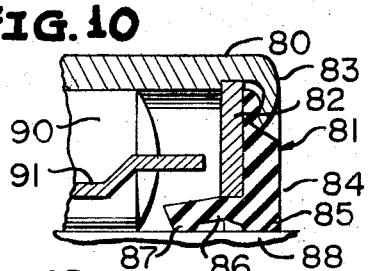
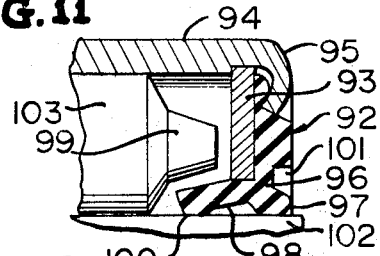
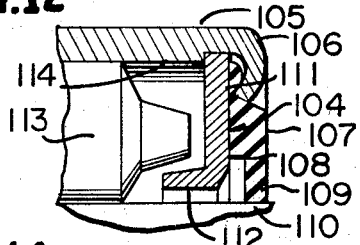
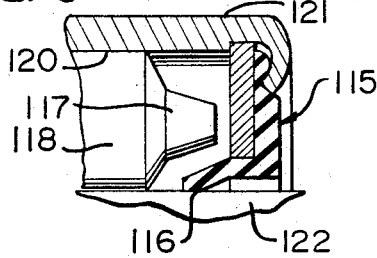
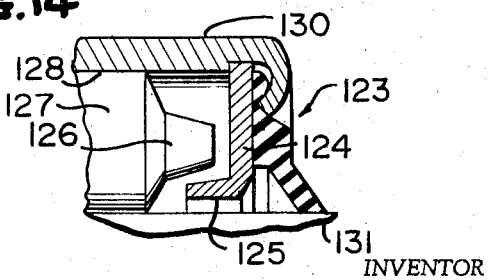
INVENTOR
JOHN H. COWLES

United States Patent Office 3,423,140
Patented Jan. 21, 1969

3,423,140
BEARING SEALS FOR DRAWN CUP BEARINGS
John H. Cowles, Forestville, Conn., assignor to The Torrington Company, Torrington, Conn., a corporation of Maine
Filed May 3, 1966, Ser. No. 547,234
U.S. Cl. 308—187.2                 20 Claims
Int. Cl. F16c 1/24, 33/78

ABSTRACT OF THE DISCLOSURE

Improvements in drawn cup bearings of the type including an outer, drawn race providing a member enclosing a plurality of rollers are disclosed herein. Sealing of the bearing assemblies is provided by an annular washer having a seal bonded thereto, the seal extending radially inwardly for contact with the shaft about which the bearing assembly is to be situated. A portion of the outer bearing cup extends radially and axially inwardly, pinching the seal against the washer adjacent the radially outermost portion of the washer and seal.

---

This application relates in general to new and useful improvements in the drawn cup bearing seal art, and more particularly relates to bearings assemblies having seals which are bonded onto metallic bearing components.

Accordingly, it is the primary object of this invention to provide a bearing assembly including a washer to which a bearing end seal has been bonded, and to retain the washer inwardly of an end of a bearing cup body, by providing a radially inwardly extending projection from the cup body, positioned against the bonded seal.

It is another object of this invention to provide a bearing assembly including a washer to which a bearing end seal has been bonded, which washer and seal are adapted for use with either full complement bearing assemblies or with bearing assemblies having caged rollers, and which bearing assembly includes a radially inwardly extending projection from a bearing cup body which retains the washer inwardly of the bearing cup body.

It is still another object of this invention to provide a bearing assembly including a washer to which a bearing end seal has been bonded, such that the seal extends radially inwardly of a bearing cup housing for resilient contact with an associated shaft, and to retain the washer inwardly of an end of the bearing cup body by providing a radially inwardly extending projection from the cup body, positioned against the bonded seal.

It is a further object of this invention to provide a bearing assembly including a washer having a bearing end seal bonded thereon, the seal having thickened ribs for exerting increased contact pressure on an associated shaft, and which bearing assembly includes a radially inwardly extending projection from a cup body positioned against the bonded seal to retain the washer inwardly of an end of the bearing cup body.

It is still another object of this invention to provide a bearing assembly including a washer to which a bearing end seal has been bonded, which seal includes a plurality of radially inwardly directed extensions adapted for engagement with an associated shaft, and to retain the washer inwardly of an end of a bearing cup body, by providing a radially inwardly extending projection from the cup body, positioned against the bonded field.

It is another object of this invention to provide a bearing assembly including a washer to which a bearing end seal has been bonded, which seal has portions extending axially inwardly or axially outwardly of a cup body, or both, for resilient contact with an associated shaft, and to provide means extending radially inwardly of a bearing cup body to retain the washer inwardly of the cup body.

It is still another object of this invention to provide a bearing assembly including a washer to which a bearing end seal has been bonded, which washer includes an axial annular portion extending inwardly of a bearing cup body, and to retain the washer inwardly of an end of the bearing cup body, by providing a radially inwardly extending projection from the cup body positioned against the bonded wall.

With the above and other objects in view that will hereinafter appear, the nature of the invention will be more clearly understood by reference to the following description, the appended claims, and the several views illustrated in the accompanying drawings.

In the drawings:

FIGURES 5 through 10 are fragmentary sectional views of portions of alternative bearing assemblies of this invention taken along lines similar to that of 3—3 of FIGURE 1, and illustrate various end seal configurations in combination with caged bearing rollers.

FIGURES 11 through 14 are fragmentary sectional views of alternative bearings assemblies of this invention taken along lines similar to that of 3—3 of FIGURE 1, and illustrate various bearing end seal and washer configurations in combination with full complements of bearing rollers.

Figure 1:
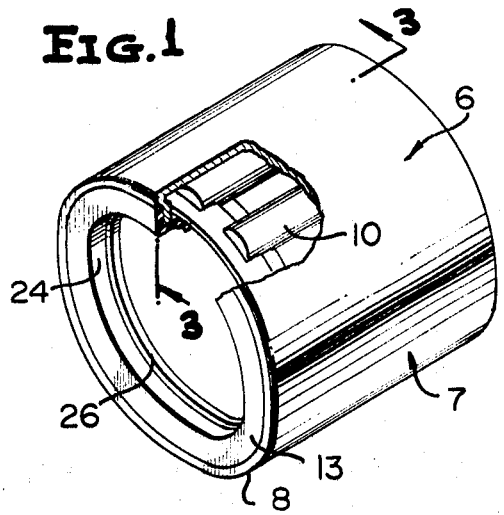
FIGURE 1 is a perspective view of the needle-bearing assembly of this invention, having a portion of one end broken away for clarity and illustrates a portion of one of the seals of this invention which is bonded to an indented cup lip.
Figure 2:
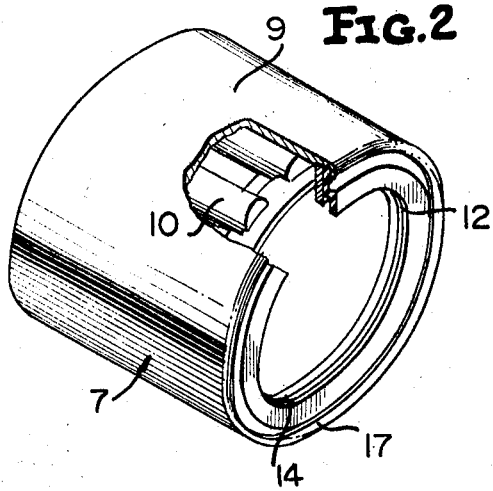
FIGURE 2 is a perspective view of the needle-bearing assembly of this invention, having an end portion thereof broken away for clarity and illustrates a portion of another of the seals of this invention which is bonded to a washer positioned inwardly of a bearing cup.
Figure 3:
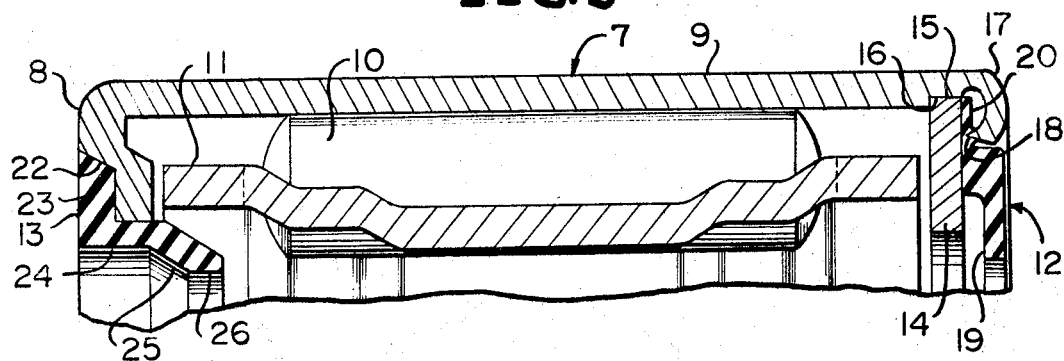
FIGURE 3 is a fragmentary cross-sectional view of a portion of the bearing assembly of FIGURE 1 taken along the line 3—3 of FIGURE 1 and illustrates an enlarged view of the bearing seals of this invention, and their manner of connection to the bearing cup.

Referring now to the drawings in detail, reference is first made to FIGURE 1 wherein there is illustrated a bearing assembly 6 of this invention. The assembly 6 includes a drawn cup having a lip 8 at one end of a cylindrical cup body 9. The cup 7 is of the outer race type and encloses rollers 10 and a retaining cage 11 (as is best shown in FIGURE 3). Seals 12 and 13 are provided at respective right and left ends of the bearing assembly (as viewed in FIGURE 3).

The seal 12 is bonded to a washer 14 during vulcanizing, and both are retained in a position at one end of the cup 7 by engagement of the outer diameter 15 of the washer in an annular groove portion 16 in the cup body 9. An inner annular radially extending portion 19 of the seal 12 is positioned axially outwardly of the washer 14, and in a plane substantially parallel to that of the washer 14 for resilient engagement with a cooperating shaft.

A peripheral lip 17 of the cup 7 is curled radially inwardly and terminates in an annular edge 18 which engages a thin bonded portion 20 of the seal 12, as by piercing. Thus, the curled peripheral lip 17 and its axially inwardly extending edge 18 pinches the seal 12 against the washer 14, retaining the washer 14 and seal 12 in position in the groove 16 of the cup body 9 and the seal 12 is securely bonded on the washer 14.

Figure 4:
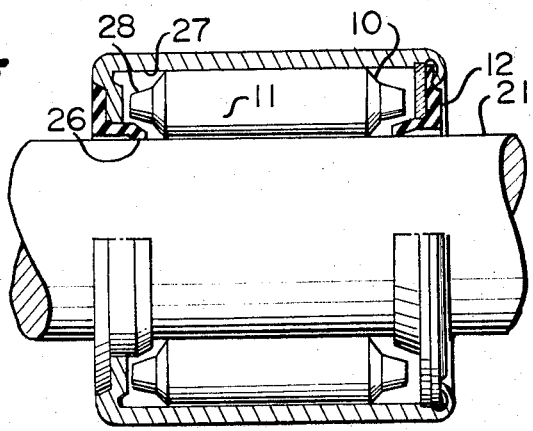
FIGURE 4 is an axial cross-sectional view of a bearing assembly of this invention taken along a line similar to that of 3—3 of FIGURE 1, but shows a cooperating shaft and other parts in elevation, illustrating the cooperation between the seals and the shaft.

The lip 8 (viewed at the left end of FIGURE 3) extends radially inwardly of the cup body 9, then axially inwardly to form a slanted portion 22, terminating in a further radially inwardly extending portion or indented lip 23. The seal 13 is bonded to the indented lip 23 during the vulcanizing. The seal 13 also extends axially inwardly of the cup 7 (as shown at 24 in FIGURE 3), then further radially and axially inwardly (as shown at 25 in FIGURE 3), to terminate in a shaft-engaging portion 26 (as best shown in FIGURE 4).

FIGURE 5 illustrates in detail an alternative configuration for a seal 30 bonded onto an axial outermost surface of a cooperating washer 31, both of which are retained adjacent one end of a drawn cup 32 by an associated peripheral lip 33, the seal being adapted to retain a lubricating fluid inwardly of the end thereof in communication with rollers 34 and a roller cage 35. The seal 30 has a radial innermost portion which terminates in an axially directed annular portion 36 inwardly of the cup 32 and in resilient contacting engagement with a cooperating shaft 37.

In FIGURE 6 there is illustrated another alternative arrangement for a bearing end, comprising a seal 38, in bonded cooperating relation to a washer 40, retained at one end of a bearing cup 41 by means of a peripheral extension or lip 42. The seal 38 includes a thick annular body portion 43 having annular radially inwardly directed ribs 44, 45 thereon, adapted for resilient engagement with an associated shaft 46. The ribs 44, 45 are illustrated as being separated by an annular groove or channel 47. The seal 38 is illustrated in combination with an associated roller 48 and a retaining cage 50 in lubricant-confining relation.

In FIGURE 7 there is illustrated in detail a seal 51, similar to that illustrated in FIGURE 6, but having a thickened annular body portion 52, which in turn has three radially inwardly directed annular ribs 53, 54 and 55 with spaced annular grooves or channels 56, 57 therebetween adapted for resilient contacting engagement with an associated shaft 58, but positioned generally axially outwardly of bearing cup 60.

In FIGURE 8 there is illustrated another bearing end seal 61, also in bonded relation to an associated washer 62 and positioned adjacent an end of a bearing cup 63 and confined inwardly thereof by an annular lip 64. The seal 61 includes an annular portion 65 extending radially inwardly and axially outwardly of the cup 63, defining a generally conical plane intersecting an associated shaft 66 in resilient contacting relation and adapted to confine a lubricant axially inwardly thereof in communication with an associated roller 67 and cooperating cage 68.

In FIGURE 9 there is illustrated another alternative bearing end seal 70, in bonded relation to an associated washer 71 and retained at one end of a bearing cup 72 by an annular lip 73. The seal 70 has an axial portion 74 extending outwardly of the bearing cup 72 and a portion 75 extending axially inwardly of the bearing cup 72 radially inwardly of the washer 71. The axial extensions 74, 75 are slightly radially directed toward an associated shaft 76, thereby adapted for resilient engagement with the shaft 76 in order to facilitate confining a lubricant inwardly of the seal 70 in communication with an associated bearing roller 77 and a cooperating cage 78.

In FIGURE 10 there is illustrated in detail another alternative arrangement for a bearing end seal within a bearing cup 80, comprising a seal 81 bonded to an associated washer 82 and confined in place by an annular lip 83 of the cup 80. The seal 81 includes a radially inwardly extending annular portion 84 having a thickened rib portion 85 at the innermost edge thereof and an axially extending annular portion 86 extending radially inwardly of the washer 82 and axially inwardly of the cup 80. The annular extension 86 has a thickened rib portion 87 at an innermost edge thereof. Thickened portions 85, 87 of the respective radially and axial extending portions 84, 86 of the seal 81 are adapted to resiliently engage an associated shaft 88 in lubricant-confining relation with an associated roller 90 and cooperating cage 91.

In FIGURE 11 there is illustrated another alternative arrangement for a seal 92, in bonded relation to an associated washer 93 and retained adjacent an end of a cup 94 by means of an annular lip 95. The seal 92 includes a radially inwardly directed annular portion 96 terminating in a thickened annular rib portion 97 and an axially inwardly extending annular portion 98 terminating in a thickened annular rib portion 100. An annular channel 101 is shown cut into the outer surface of the radial portion 96 of the seal 92, to decrease the resilient engagement of rib 97 against an associated shaft 102, as compared with the resilient engagement of rib portion 100 with the shaft 102. The seal portion 100 is also adapted to confine the trunnion ends 99 of rollers 103 generally radially outwardly within the cup 94 in order to retain the rollers 103 in position for assembly onto the shaft 102.

In FIGURE 12 there is illustrated an alternative seal and washer combination 104 retained adjacent one end of a bearing cup 105 by means of annular inwardly directed lip 106. The seal and washer combination 104 includes a seal 107 and a washer 108. The seal 107 has a radially inwardly directed annular lip portion 109, adapted for resilient engagement with the cooperating shaft 110. The washer 108 includes a disc portion 111 and an annular axially inwardly directed flange portion 112. The flange portion 112 of the washer 108 is adapted to retain one end of trunnion-end rollers 113 in position generally adjacent race 114 of the cup 105 during an assembling operation of the bearing assembly onto the shaft 110.

In FIGURE 13 there is illustrated a bearing end seal 115, generally similar to that illustrated in FIGURE 5, but wherein an annular axially inwardly directed seal portion 116 is adapted to confine trunnion-ends 117 of rollers 118 generally radially outwardly adjacent a race 120 of cup 121, during assembly of the bearing assembly onto a shaft 122.

In FIGURE 14 there is illustrated a bearing end seal and washer combination 123, generally similar to that illustrated in FIGURE 8, but wherein the washer 124 has an annular axially directed inward extension 125 thereon adapted to confine a trunnion-end 126 of a roller 127 in a generally radial outward position adjacent a race 128 of a bearing cup 130 during assembly of the bearing onto a cooperating shaft 131.

The various bearing cups illustrated may be formed of drawn sheet metal and may each have a hard inner surface (race) to accommodate their associated rollers. The rollers may have suitable end configurations such as spherical ends, trunnion ends, flat ends, etc., and may be retained in position either by means of cages or by axial extensions of either the seals or the washers. The seals may be of rubber or plastic construction, or the like as desired.

Although only preferred embodiments of the invention have been described and illustrated herein, it is to be understood that minor modifications have been made in the bearing end seals and in their application within the spirit and scope of the invention, as defined in the appended claims.

I claim:
1. In a needle bearing assembly of the drawn cup outer race type having rollers mounted for rotation within said race; the improvement comprising a bearing end seal bonded to a washer; said washer being retained inwardly of the needle-bearing cup body across the end thereof and being positioned axially adjacent an end of said rollers, a projection of said cup body being turned radially and axially inwardly, contacting said seal only along a limited portion of said seal adjacent the radial outermost portion thereof and pinching said seal against said washer, the radially innermost portion of said seal comprising means for contacting a shaft extending through said assembly in sealing relation to said shaft.

2. The combination of claim 1 wherein said seal is bonded to said washer opposite said cup body projection.

3. The combination of claim 1 wherein said cup body projection pierces that portion of said seal which is bonded to said washer.

4. The combination of claim 1 wherein said seal includes a portion of reduced thickness bonded to said washer, said cup body projection contacting only said portion of reduced thickness and pinching said portion of reduced thickness against said washer.

5. The combination of claim 1 wherein said rollers are secured in position adjacent their race by a retaining race.

6. The combination of claim 1 wherein said bearing assembly comprises a full complement of rollers.

7. The combination of claim 1 wherein said seal has an annular portion extending axially of said cup body adapted for resilient contact with said shaft.

8. The combination of claim 7 wherein said seal axially extending annular portion is directed inwardy of said cup body.

9. The combination of claim 7 wherein said seal axially extending annular portion is directed outwardly of said cup body.

10. The combination of claim 1 wherein said seal has a first annular portion extending axially inwardly of said cup body and a second annular portion extending axially outwardly of said cup body; both of said axially extending annular portions being adapted for engagement with said shaft.

11. The combination of claim 1 wherein said seal has a radially inwardly extending annular portion and an axially extending annular portion; both of said extending portions being adapted for engagement with a shaft.

12. The combination of claim 11 wherein terminal edges of said radial inward and said axial annular extending portions comprise thickened annular rib portions.

13. The combination of claim 1 wherein said washer has an axially directed annular portion extending inwardly of said cup body in adjacent concentric relation to said shaft and is adapted to retain rollers about the inner surface of the bearing cup during installation of the bearing assembly onto the shaft.

14. The combination of claim 1 wherein said seal has a radially inward annular extension portion adapted for resilient contact with said shaft.

15. The combination of claim 1 wherein said seal has a plurality of radially inwardly annular extension portions adapted for resilient contact with said shaft.

16. The combination of claim 13 wherein said seal has a radially inward annular extension portion adapted for resilient contact with said shaft.

17. The combination of claim 5 wherein said seal has a radially inward annular extension portion adapted for resilient contact with said shaft.

18. The combination of claim 13 wherein said seal has an annular portion extending axially of said cup body adapted for resilient engagement with said shaft and wherein said seal axially extending annular portion is directed outwardly of said cup body.

19. The combination of claim 12 wherein an axial outermost seal surface is provided an annular groove adapted to facilitate the engagement of an associated resilient rib with the shaft under a desired contact pressure.

20. The combination of claim 8 wherein said axially extending annular portion defines means for engaging roller ends for confining rollers substantially adjacent a bearing cup race to facilitate installation of the bearing assembly onto a shaft.

References Cited

UNITED STATES PATENTS

| | | | |
|---|---|---|---|
| 2,118,027 | 5/1938 | Barish | 308—187.2 X |
| 2,750,212 | 6/1956 | Skinner | 277—183 X |
| 2,932,535 | 4/1960 | Peickii | 277—183 |
| 3,368,853 | 2/1968 | Van Wyk | 308—187.2 |
| 2,907,596 | 10/1959 | Maha | 277—205 |
| 3,003,799 | 10/1961 | Marchionda | 277—205 X |
| 3,021,161 | 2/1962 | Rhoads | 277—208 X |
| 3,203,511 | 8/1965 | Long | 277—208 |
| 3,206,829 | 9/1965 | Schaeffler | 308—187.1 X |
| 3,207,521 | 9/1965 | Dega | 277—208 X |
| 3,306,682 | 2/1967 | Cowles | 308—187.2 |
| 3,341,265 | 9/1967 | Paterson | 308—187.1 |
| 3,348,889 | 10/1967 | Schaeffler | 308—187.2 |

FOREIGN PATENTS

| | | |
|---|---|---|
| 74,694 | 2/1945 | Austria. |
| 864,678 | 1/1941 | France. |
| 546,260 | 7/1932 | Great Britain. |
| 811,356 | 4/1959 | Great Britain. |
| 1,058,318 | 5/1959 | Germany. |
| 1,162,646 | 2/1964 | Germany. |

MARTIN P. SCHWADRON, *Primary Examiner.*

LUCIOUS L. JOHNSON, *Assistant Examiner.*